United States Patent
Karlsson et al.

(10) Patent No.: US 11,470,199 B2
(45) Date of Patent: Oct. 11, 2022

(54) SYSTEM AND METHOD FOR PERSONALIZING A SHARED CONFERENCING DEVICE OR A SHARED PRINTER/SCANNER

(71) Applicant: Avaya Inc., Santa Clara, CA (US)

(72) Inventors: Torbjörn Karlsson, Sundsvall (SE); Peter Fredriksson, Umeå (SE); Tommy Edlund, Umeå (SE)

(73) Assignee: Avaya Inc., Santa Clara, CA (US)

(*) Notice: Subject to any disclaimer, the term of this patent is extended or adjusted under 35 U.S.C. 154(b) by 0 days.

(21) Appl. No.: 15/902,664

(22) Filed: Feb. 22, 2018

(65) Prior Publication Data

US 2018/0249014 A1 Aug. 30, 2018

Related U.S. Application Data

(60) Provisional application No. 62/463,261, filed on Feb. 24, 2017.

(51) Int. Cl.
| | |
|---|---|
| *H04M 3/56* | (2006.01) |
| *H04W 4/80* | (2018.01) |
| *H04L 65/403* | (2022.01) |
| *H04L 65/1069* | (2022.01) |
| *H04L 65/1104* | (2022.01) |

(52) U.S. Cl.
CPC ........ *H04M 3/562* (2013.01); *H04L 65/1069* (2013.01); *H04L 65/1104* (2022.05); *H04L 65/403* (2013.01); *H04M 3/567* (2013.01); *H04W 4/80* (2018.02); *H04M 2207/187* (2013.01)

(58) Field of Classification Search
CPC ..... H04M 3/567; H04L 65/1069; H04W 4/80; G06F 3/0486
USPC .................................................. 379/202.01
See application file for complete search history.

(56) References Cited

U.S. PATENT DOCUMENTS

| | | | | |
|---|---|---|---|---|
| 6,157,706 A * | 12/2000 | Rachelson | ............ | H04L 51/066 379/100.08 |
| 8,340,272 B2 * | 12/2012 | Knaz | ....................... | H04W 4/16 379/211.02 |

(Continued)

OTHER PUBLICATIONS

Rosenberg et al. "SIP: Session Initiation Protocol," The Internet Society, Jun. 2002, RFC 3261, 252 pages.

*Primary Examiner* — Ahmad F. Matar
*Assistant Examiner* — Jirapon Intavong
(74) *Attorney, Agent, or Firm* — Sheridan Ross P.C.

(57) ABSTRACT

A conferencing device receives an indication that a mobile device is in proximity to the conferencing device. The conferencing device receives information, directly from the mobile device, that indicates that the conferencing device is to establish or join a communication session with one or more communication endpoints. The information that indicates that the first conferencing device is to establish or join the communication session with the one or more communication endpoints is based on information that is personal to a user of the mobile device. Once the communication session is established, the conferencing device communicates with the one or more communication endpoints in the communication session. In an alternative embodiment, a printer/scanner can be managed based on personal information received directly from the mobile device.

17 Claims, 8 Drawing Sheets

(56) References Cited

U.S. PATENT DOCUMENTS

| | | | |
|---|---|---|---|
| 8,542,810 B2* | 9/2013 | Carr | H04L 12/1818 |
| | | | 370/261 |
| 8,866,872 B2 | 10/2014 | Couse | |
| 9,369,673 B2 | 6/2016 | Ma et al. | |
| 9,495,663 B2 | 11/2016 | Ramaswamy et al. | |
| 9,521,244 B2* | 12/2016 | Choi | H04M 1/72566 |
| 2009/0081999 A1* | 3/2009 | Khasawneh | H04M 3/56 |
| | | | 455/416 |
| 2010/0188473 A1* | 7/2010 | King | H04L 12/1818 |
| | | | 348/14.02 |
| 2012/0322376 A1* | 12/2012 | Couse | H04M 1/7253 |
| | | | 455/41.2 |
| 2013/0342866 A1* | 12/2013 | Hansen | H04N 1/4413 |
| | | | 358/1.14 |
| 2014/0051383 A1* | 2/2014 | Doerr | H04W 4/16 |
| | | | 455/405 |
| 2014/0267559 A1* | 9/2014 | Krantz | H04M 9/082 |
| | | | 348/14.08 |
| 2015/0074558 A1* | 3/2015 | Haskins | G06F 16/245 |
| | | | 715/753 |
| 2016/0255666 A1* | 9/2016 | Bell | H04L 12/66 |
| | | | 380/270 |

* cited by examiner

SYSTEM AND METHOD FOR PERSONALIZING A SHARED CONFERENCING DEVICE OR A SHARED PRINTER/SCANNER

CROSS REFERENCE TO RELATED APPLICATION

The present application claims the benefits of U.S. Provisional Application Ser. No. 62/463,261, filed Feb. 24, 2017, entitled "Konftel 300IPx and Konftel Unite", which is incorporated herein by this reference in its entirety.

FIELD

The disclosure relates generally to conferencing systems and particularly to controlling of conferencing systems via a mobile device.

BACKGROUND

Today, there are varieties of conferencing phones that are used in conference rooms. Because the conference phones are not used as often as personal phones, users typically do not use many of the supported features of conference phones. Conference phones are seen as non-personal products because they are shared by many different users. In addition, conference phones typically have a limited user interface, which causes many of the supported features to be difficult to access. This makes conference phones less user-friendly, especially for non-frequent users.

SUMMARY

These and other needs are addressed by the various embodiments and configurations of the present disclosure. A conferencing device receives an indication that a mobile device is in proximity to the conferencing device. The conferencing device receives information, directly from the mobile device, that indicates that the conferencing device is to establish or join a communication session with one or more communication endpoints. The information that indicates that the first conferencing device is to establish or join the communication session with the one or more communication endpoints is based on information that is personal to a user of the mobile device. Once the communication session is established, the conferencing device communicates with the one or more communication endpoints in the communication session.

In an alternative embodiment, a printing/scanning device receives an indication that a mobile device is in proximity to the printing/scanning device and has been paired with to the printing/scanning device. The printing/scanning device receives information, directly from the mobile device, that indicates that the printing/scanning device is to at least one of: (i) print, a document, (ii) send a scanned document in an email or text message as an attachment, (iii) send an email or text message that indicates a fax was sent, and (iv) send the scanned document to the mobile device so that the mobile device can send an email with the scanned document as an attachment. Steps (i), (ii), (iii), and (iv) are implemented based on personal information of a user of the mobile device that is sent directly to the to the printing/scanning device from the mobile device.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The term "Session Initiation Protocol" (SIP) as used herein refers to an IETF-defined signaling protocol, widely used for controlling multimedia communication sessions such as voice and video calls over Internet Protocol (IP). The protocol can be used for creating, modifying and terminating two-party (unicast) or multiparty (multicast) sessions consisting of one or several media streams. The modification can involve changing addresses or ports, inviting more participants, and adding or deleting media streams. Other feasible application examples include video conferencing, streaming multimedia distribution, instant messaging, presence information, file transfer and online games. SIP is as described in RFC 3261, available from the Internet Engineering Task Force (IETF) Network Working Group, November 2000; this document and all other SIP RFCs describing SIP are hereby incorporated by reference in their entirety for all that they teach.

The term "means" as used herein shall be given its broadest possible interpretation in accordance with 35 U.S.C., Section 1140 and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. In addition, while the disclosure is presented in terms of exemplary embodiments, it should be appreciated that individual aspects of the disclosure can be separately claimed.

DETAILED DESCRIPTION

Figure 1:
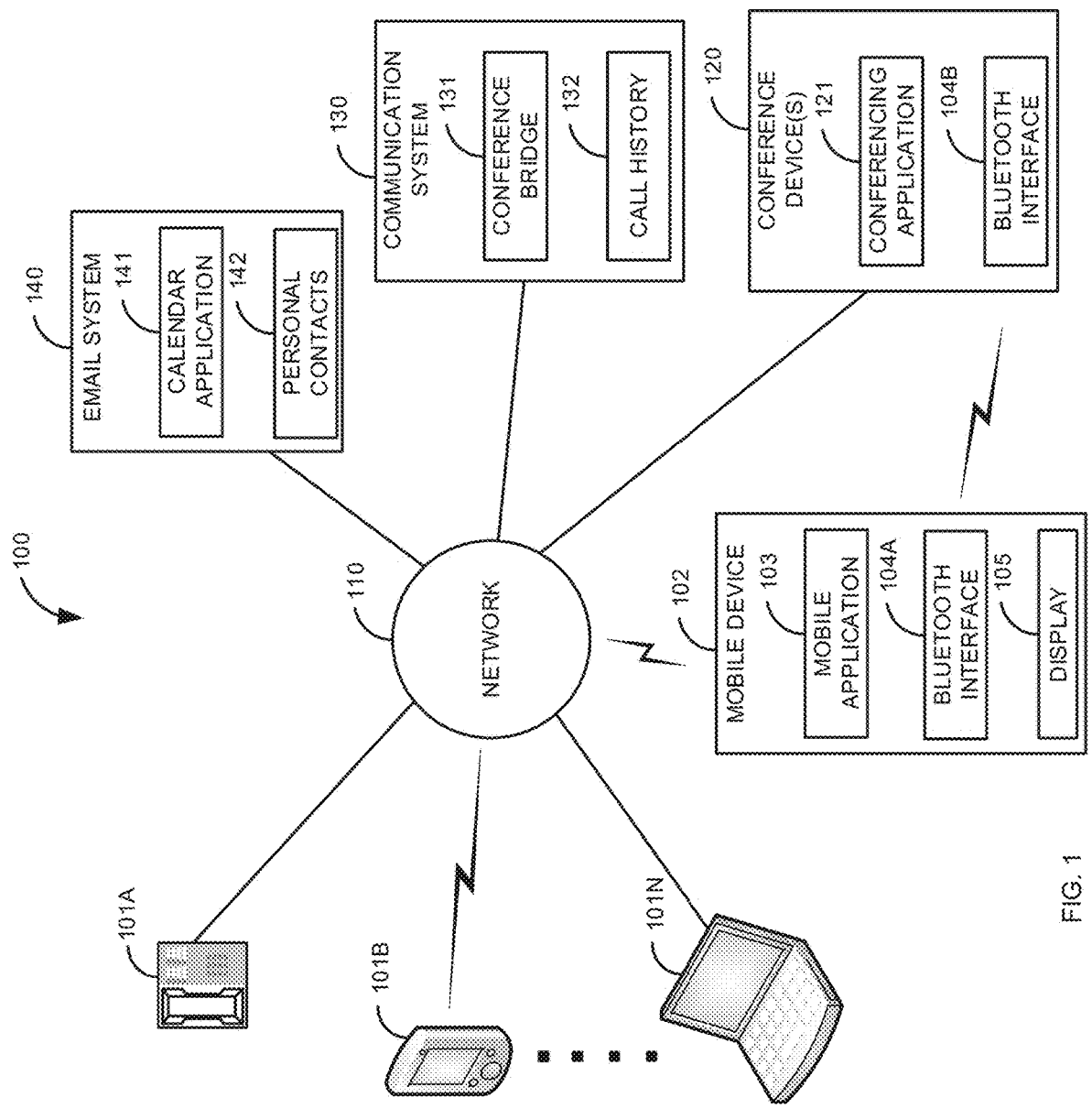
FIG. 1 is a block diagram of a first illustrative system for personalizing a shared conferencing device.

FIG. 1 is a block diagram of a first illustrative system 100 for personalizing a shared conferencing device 120. The first illustrative system 100 comprises communication endpoints 101A-101N, a mobile device 102, a network 110, conferencing device(s) 120, a communication system 130, and an email system 140.

The communication endpoints 101A-101N can be or may include any communication endpoint device that can communicate on the network 110, such as a Personal Computer (PC), a telephone, a video system, a cellular telephone, a Personal Digital Assistant (PDA), a tablet device, a notebook device, a web server, a media server, a smart phone, and/or the like. The communication endpoints 101A-101N are devices where a communication sessions ends. The communication endpoints 101A-101N are not network elements that facilitate and/or relay a communication session in the network 110, such as a communication manager or router. As shown in FIG. 1, any number of communication endpoints 101A-101N may be connected to the network 110.

The mobile device 102 can be or may include any mobile device 102 that can be used to communicate directly with the conferencing device(s) 120, such as, a smart phone, a cellular telephone, a PDA, a tablet device, a notebook device, and/or the like. The mobile device 102 further comprises a mobile application 103, a Bluetooth® interface 104A, and a display 105.

The mobile application 103 can be or may include any application that can be used to communicate with the conference device(s) 120. The mobile application 103 is typically downloaded to the mobile device 102. The mobile application 103 is used to provide a personalized and familiar user interface for managing the conferencing device(s) 120.

The Bluetooth® interface 104A may be any standard Bluetooth® interface 104, such as, a Bluetooth® Low Energy (LE) interface. In alternative embodiments, other types of interfaces may be used in place of the Bluetooth® interface 104, such as, infrared, ZigBee®, Near Field Communication (NFC), and/or the like. These communication protocols are typically direct communication protocols (i.e., that do not go through a router or other communication element).

The display 105 can be or may include any hardware display, such as a Liquid Crystal Display (LCD), a touch screen display, a Light Emitting Diode (LED) display, and/or the like. The display 105 can be used to display a user interface for communicating with the conferencing device(s) 120.

The network 110 can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The network 110 can use a variety of electronic protocols, such as Ethernet, Internet Protocol (IP), Session Initiation Protocol (SIP), cellular protocols, Integrated Services Digital Network (ISDN), and/or the like. Thus, the network 110 is an electronic communication network configured to carry messages via packets and/or circuit switched communications.

The conference device 120 is a typically a shared device that is typically used by multiple different users, such as a conferencing device 120 in a conference room. In some embodiments, the conferencing device 120 may be at a user's desk. Although FIG. 1 only shows a single conference device 120, in other embodiments, there may be multiple conference devices (i.e., 120A-120N). For example, a building may have multiple conferencing devices 120A-120N.

The conference device(s) 120 may be an audio and/or video conferencing device 120. The conferencing device(s) 120 may comprise multiple elements, such as multiple cameras, multiple microphones, multiple conferencing elements, and/or the like.

The conferencing device(s) 120 further comprises a conferencing application 121 and a Bluetooth® interface 104B. The conferencing application 121 can be or may include any conferencing application 121 that can be used to communicate with the mobile application 103. The Bluetooth® interface 104B in the conference device(s) 120 is used to communicate with the Bluetooth® interface 104A in the mobile device 102.

The communication system 130 can be or may include hardware coupled with software that can manage and control communication sessions, such as, a Private Branch Exchange (PBX), a communication manager, a session manager, a central office switch, a proxy server, a router, and/or the like. The communication manager may use a variety of protocols, such as SIP, H.323, video protocols, WebRTC, and/or the like. The communication manager 130 is used to establish communication sessions between the communication endpoints 101A-101N and the conference device(s) 120. The communication manager 130 can establish/manage various types of communication sessions, such as, voice communications, video communications, Instant Messaging (IM) communications, text communications, multimedia communications, virtual reality communications, and/or the like.

The communication system 130 further comprises a conference bridge 131 and a call history 132. The conference bridge 131 can be or may include any hardware coupled with software that can manage conference calls between multiple users, such as, an audio mixer, a video mixer, a multi-point-control unit (MCU), and/or the like.

The call history 132 is a personalized call history for the user of the mobile device 102. The call history 132 may be for calls made to and/or from the mobile device 102 and/or other devices of the user, such as a desktop telephone, a video phone, a softphone, and/or the like. The call history 132 may also comprise a call history of chat sessions, text messages, and/or the like. Although shown in the communication system 130, in one embodiment, the call history 132 may be in the mobile device 102.

The email system 140 can be or may include any email system that can send an email, such as Microsoft Outlook® Microsoft Exchange®, Gmail®, Simple Mail Transfer Protocol (SMPT), Novell Groupwise®, Lotus Notes®, and/or the like. The email system 140 may be part of the communication system 130 that can accommodate all types of communications.

The email system 140 also comprises a calendar application 141 and personal contacts 142. The calendar application 141 can be or may include any application that allows a user to schedule calendar events, such as, a meeting event, a conference call, a video call, an IM session, an appointment, and/or the like. In one embodiment, the email system 140 may be part of the communication system 130.

The personal contacts 142 can be or may include a list of contact that are used by the email system 140 to send emails. The personal contacts 142 may also comprise contacts used in other communication types, such a voice, video, IM, text, multimedia, virtual reality, and/or the like.

Although not shown, FIG. 1 may also comprise other types of communication elements, such as an IM system, a text messaging system, a virtual reality system, and/or the like.

Figure 2:
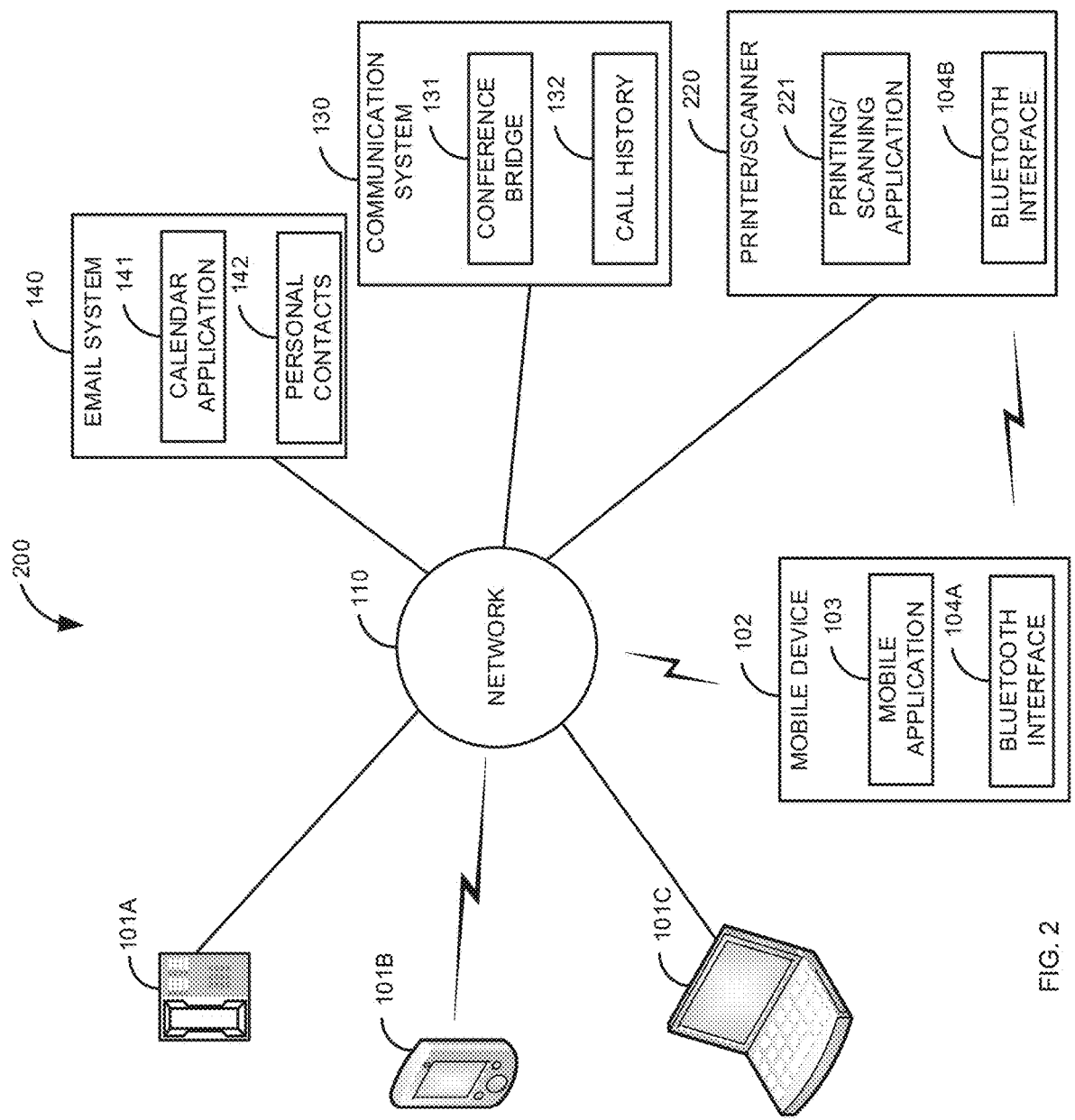
FIG. 2 is a block diagram of a second illustrative system for personalizing a printer/scanner.

FIG. 2 is a block diagram of a second illustrative system 200 for personalizing a printer/scanner 220. The second illustrative system 200 comprises the communication endpoints 101A-101N, the mobile device 102, the printer/scanner 220, the communication system 130, and the email system 140.

Figure 3:
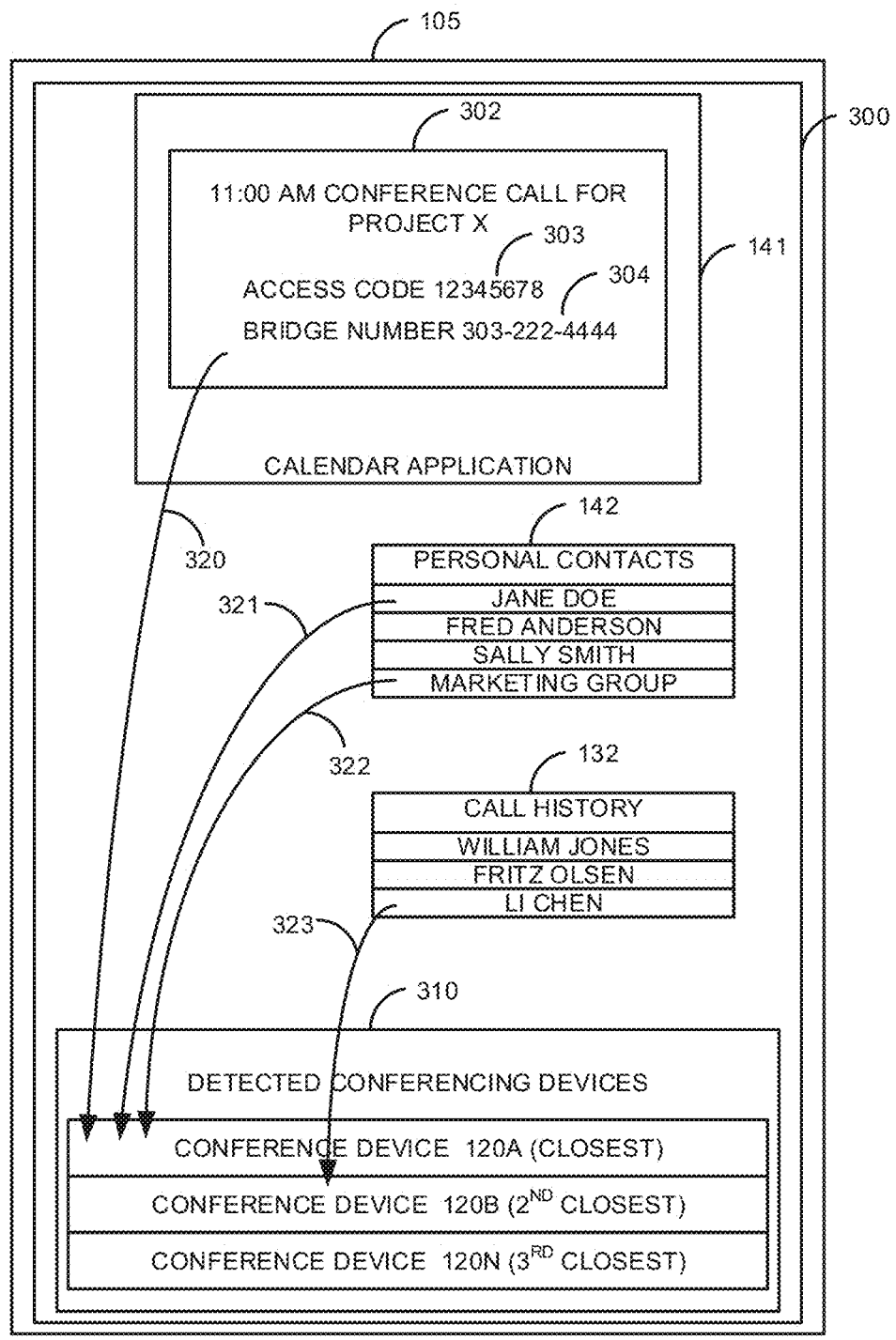
FIG. 3 is an exemplary user interface for personalizing a shared conferencing device.
Figure 4:
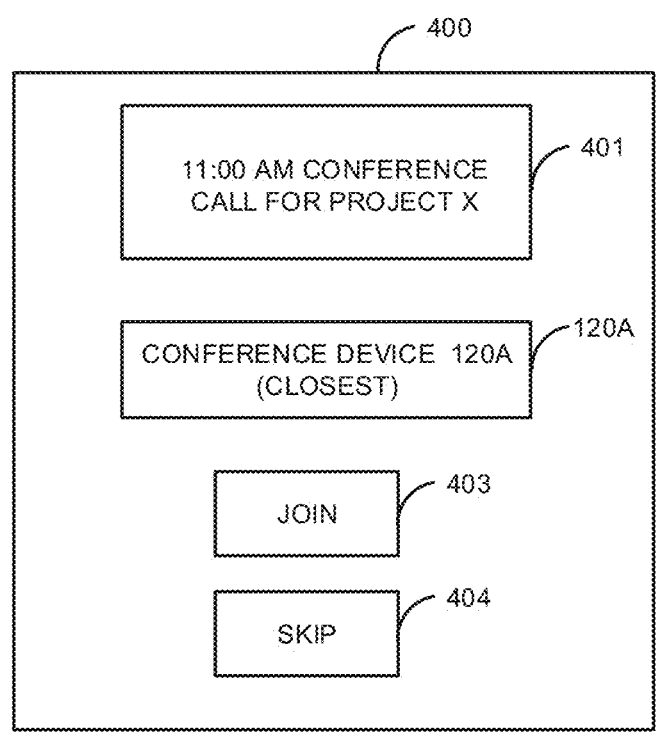
FIG. 4 is an exemplary user interface for matching a calendar event for a meeting to a shared conference device.
Figure 5:
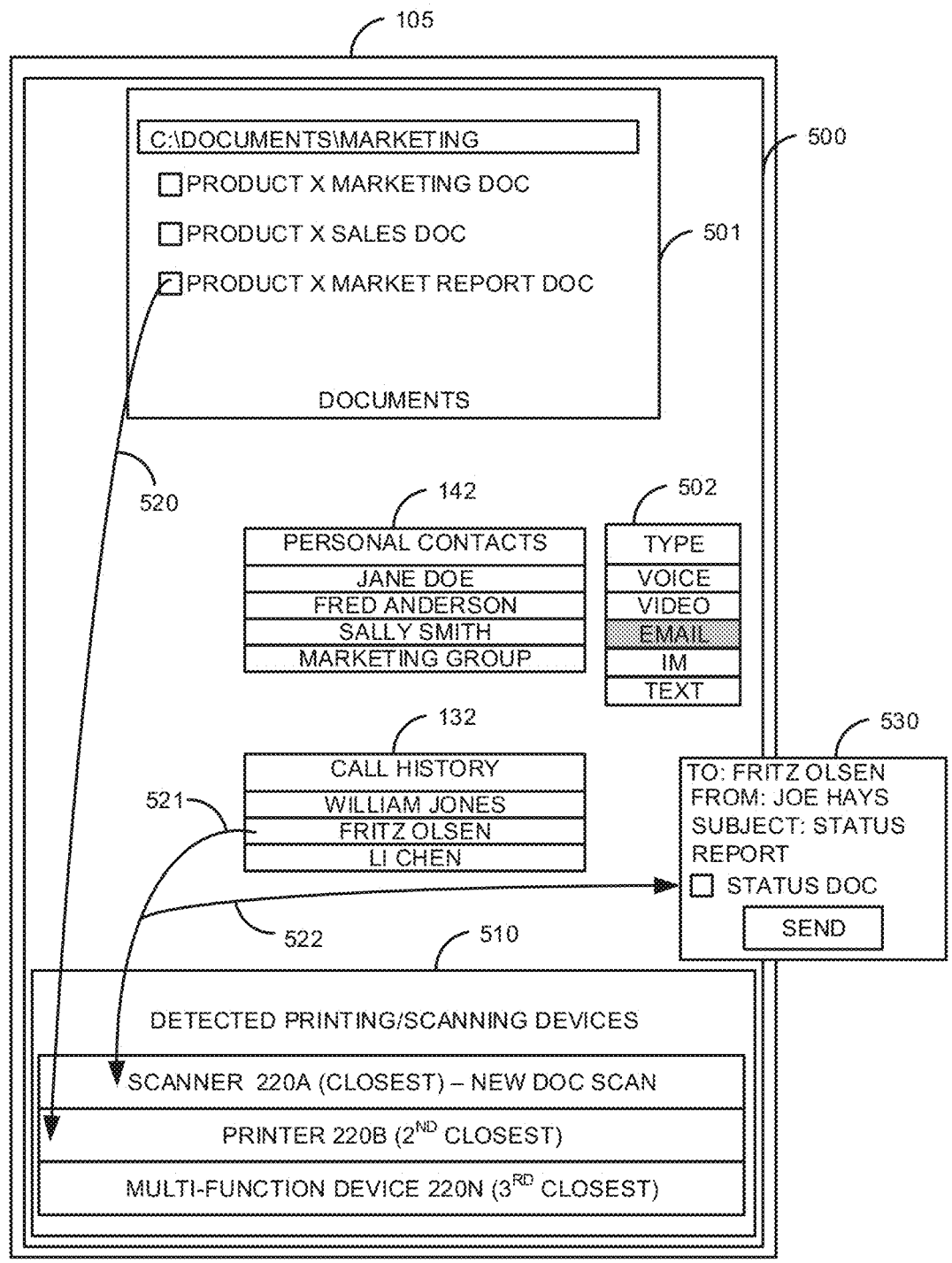
FIG. 5 is an exemplary user interface for personalizing a printer/scanner.
Figure 6:
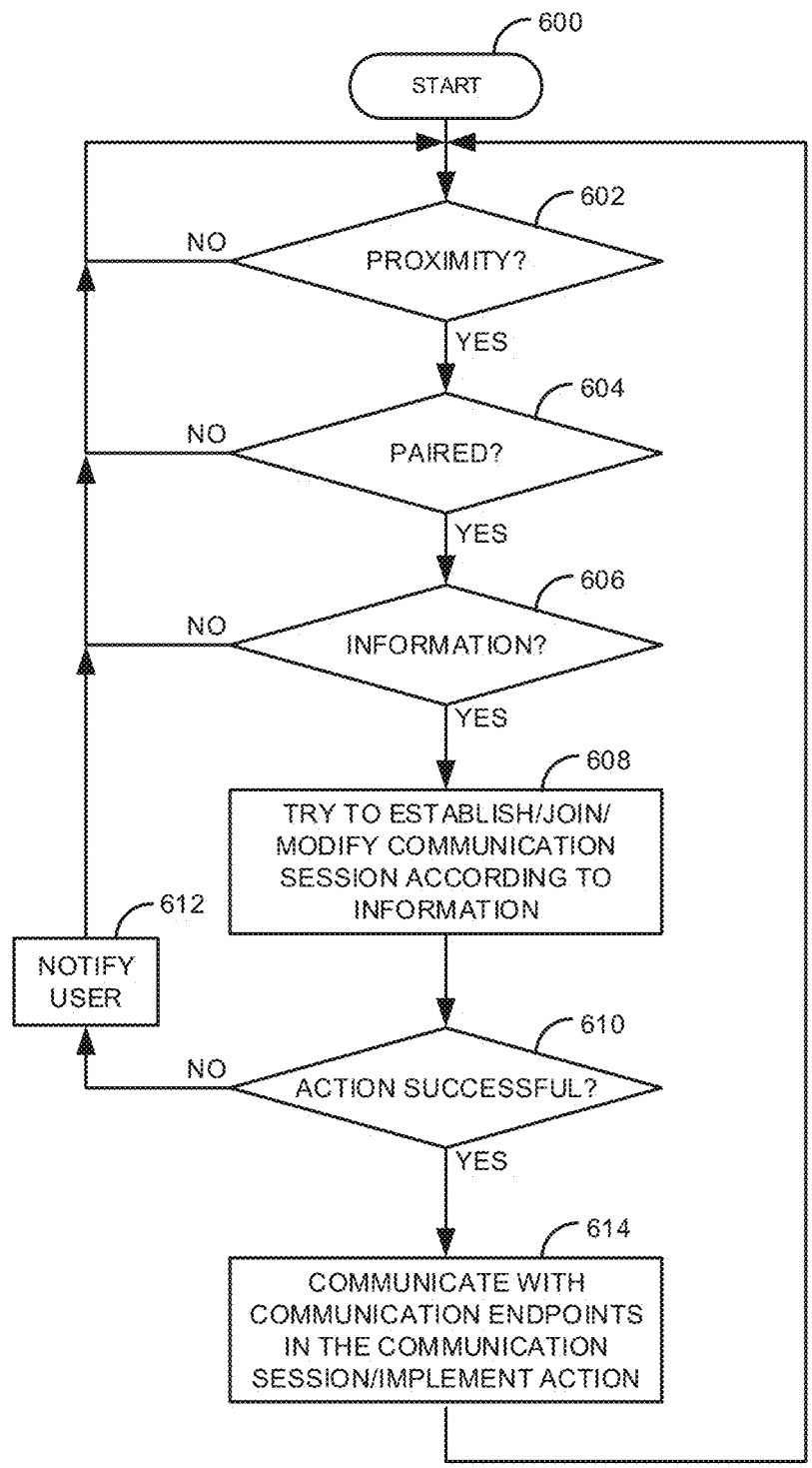
FIG. 6 is a flow diagram of a process for personalizing a shared conferencing device.

In FIG. 2, the communication endpoints 101A-101N, the mobile device 102, the communication system 130, and the email system 140 may work in similar manner as described for FIG. 1 and as discussed in FIGS. 3, 5, and 6. In addition, or separately, these elements may work in conjunction with the process/methods described in FIGS. 4 and 7. For example, the mobile application 103 may work with the printer/scanner 220 and/or the conference device(s) 120 to provide personalized services for the printer/scanner 220 and/or personalized services for the conference device(s) 120. Likewise, the communication system 130 and/or the email system 140 may work for the processes described herein for the printer/scanner 220 and/or the conference device 120.

The printer/scanner 220 can be or may include any hardware device that can scan, print, and/or fax documents. The printer/scanner 220 can be a multi-function device that can scan, print, and fax documents. The printer/scanner 220 further comprises a printing/scanning application 221 and the Bluetooth® interface 104B. The printing/scanning application 221 can be or may include any application that communicates with the mobile application 103 to provide personalized printing, scanning, and/or faxing services.

The Bluetooth® interface 104B is used to communicate with the Bluetooth® interface 104A to provide a direct interface between the mobile device 102 and the printer/scanner 220.

FIG. 3 is an exemplary user interface 300 for personalizing a shared conferencing device 120. FIG. 3 shows the user interface 300, in the display 105 of the mobile device 102, which is provided by the mobile application 103 to a user of the mobile device 102.

The user interface 300 further comprises the call history 132, the calendar application 141, the personal contacts 142, and a list of detected conferencing devices 310. In this exemplary illustration, the calendar application 141 shows a calendar event for an upcoming (or started) conference call 302. The calendar event for the upcoming conference call 302 is for a conference call that starts at 11:00 AM that is for Project X. The calendar event for the upcoming conference call 302 also includes information about the conference call. For example, in this embodiment, an access code 303 and bridge number 304 for the conference call are included in the calendar event for the upcoming conference call 302. Although not shown, the calendar event for the upcoming call 302 may also comprise other information, such as a date, users who are scheduled to be in the upcoming conference call, users who are currently in the conference call (i.e., if the conference call has already started), and/or the like. The mobile application 103/conferencing application 121 may use any of this information to manage/establish the conference call.

Although not shown the calendar application 141 may show other calendar events, such as an upcoming video conference call, an upcoming IM session, a note to send an email a user at a specific time, an upcoming appointment, previous calls or appointments, and/or the like.

The personal contacts 142 show a list of personal contacts 142 for a user of the mobile device 102. The personal contacts 142, in this example, include the contacts Jane Doe, Fred Anderson, and Sally Smith. The personal contacts 142 also include a contact group (Marketing Group). A contact group may include one or more persons. Although not shown, the personal contacts 142 may comprise other information, such as, telephone numbers of different devices, email addresses, home addresses, etc. for one or more (or all) of the personal contacts 142. For example, a user of the mobile device 102 may touch on an individual contact in the personal contacts 142 to display additional information about the selected personal contact. Similarly, the user may touch the marketing group to display the names of the individual contacts in the marking group.

The call history 132 shows a list of recent calls. For example, as shown in FIG. 3, the call history 132 shows that there were recent calls with William Jones, Fritz Olsen, and Li Chen. The call history may be based on incoming or outgoing calls. The call history 132 may be based on a chronological history of calls. The call history 132 may include voice, video, IM, email, and/or other types of communications. The call history 132 may only list recent calls (e.g., with a specific time period). The call history 132 may allow a user of the mobile device 102 to scroll down to less recent calls.

The list of detected conferencing devices 310 shows a list of conference devices 120 that are currently within range of the Bluetooth® interface 104A of the mobile device 102. For example, the Bluetooth® interface 104A may detect the conference devices 120 (e.g., 120A-120N) by detecting Bluetooth® Low Energy (LE) beacons (i.e., advertising information) that are being sent from the Bluetooth® interfaces 104B in multiple conference devices 120. The list of detected conferencing devices 310 displays which of the conferencing devices 120 are the closest (e.g., by showing a range/distance from the mobile device 102 for each of the conferencing devices 120). This allows a user to walk into a conference room and select the conference device 120 that is in the conference room because it will be the closest conference device 120.

The list of detected conferencing devices 310 displays which of the conferencing devices 120 are the closest (e.g., by showing a range/distance from the mobile device 102 for each of the conferencing devices 120). This allows a user to walk into a conference room and select the conference device 120 that is in the conference room because it will be the closest conference device 120.

A user of the mobile device 102, via the user interface 300, can establish a communication session, join a communication session, and/or manage a communication session for the conference device 120. For example, the user may want to join an existing call (one that is getting started on the conference bridge 131). After going into a conference room that includes the conference device 120A (the closest conference device 120A), the user, via the user interface 300, drags-and-drops the calendar event for the upcoming conference call 302 onto the conference device 120A (i.e., a user selection) as shown in step 320. In one embodiment, when the user drags-and-drops the calendar event for the upcoming conference call 302 onto the conference device 120A, the user may be asked for an additional pass code to allow the user to access the conference device 120. The information from the calendar event for the upcoming conference call 302 is then directly sent to the conferencing application 121, via Bluetooth® interfaces 104A-104B. The conferencing application 121 then takes the bridge number 304 (303-222-4444) and calls the conference bridge 131. The conferencing application 121 then provides the access code 303 (12345678) to allow the user to join the conference call for Project X.

Alternatively, the user of the mobile device 102 may drag-and-drop, from the personal contacts 142, the name of the user of Jane Doe onto the conference device 120A as shown in step 321. The mobile application 103 gets the telephone number of Jane Doe (e.g., the telephone number of communication endpoint 101A) and directly sends, via Bluetooth® interfaces 104A-104B, the telephone number of Jane Doe to the conferencing application 121. The conferencing application 121 calls Jane Doe's telephone number to establish a communication session with Jane Doe. If the user then wants to add an additional person in the call, the user can then drag-and-drop another contact (e.g., Fred Anderson) or a contact from the call history 132 (e.g., William Jones) onto the conference device 120A to add that selected user to the call.

After the call is established with Jane Doe, the user could also drag-and-drop a group onto the conference device 120A. For example, the user of the mobile device 102 could drag-and-drop the marketing group onto the conference device 120A. This would then cause the members of the marketing group to be called and added to the conference call when answered.

In another embodiment, the user may drag-and-drop the personal contact 142 marketing group onto the conference device 120A as shown in step 322. In response to the user dragging-and-dropping the marketing group onto the conference device 120A, the mobile application 103 gets the telephone numbers (or other type of address of the users of the marketing group) of each of the users in the marketing group and directly sends, via Bluetooth® interfaces 104A-104B, the telephone numbers of the users (e.g., the telephone numbers of communication endpoints 101A-101N) of the marketing group to the conferencing application 121. The conferencing application 121 can then call each of the users of the marketing group using the telephone numbers sent by the mobile application 103 to include the marketing group in the conference call.

In an alternative embodiment, after receiving the telephone numbers for the marketing group, the conferencing application 121 may call the conference bridge 131 and establish a communication session with the conference bridge 131. The conferencing application 121 then sends the telephone numbers for the marketing group and the conference bridge 131 then calls each member of the marketing group to establish the conference call.

In one embodiment, when the calendar event for the upcoming conference call 302 is first sent out, the calendar event for the upcoming conference call 302 can indicate a proposed telephone number (or other address) for contacting a user that is called in the conference call. The user may accept the calendar event for the upcoming conference call 302, but then propose a different telephone number (or other address) that the user can be reached when the conference call is established.

If the user wanted to add an additional user to the conference call with the marketing group, the user could then drag-and-drop a user from the personal contacts 142 or the call history 132 to add the selected user to the conferencing call with the marketing group. The selected user would then be added to the call with the marketing group when answered.

In another embodiment, a user at the mobile device 102 may use the call history 132. For example, as shown in step 323, the user of the mobile device 102 can drag-and-drop, from the call history 132, the user Li Chen onto the conference device 120B to establish a communication session with Li Chen (e.g., at communication endpoint 101B).

In response to receiving the drag-and-drop of step 323, the mobile application 103 directly sends, via the Bluetooth® interfaces 104A-104B, the telephone number of Li Chen to the conferencing application 121. The conferencing application 121 (in conference device 120B) then establishes a communication session with Li Chen. If the user then wants to add an additional person in the call, the user can then drag-and-drop another contact (e.g., Fred Anderson) or another name from the call history 132 (e.g., William Jones) onto the conference device 120A to add that selected user to the conference call.

After the call is established with Li Chen, the user of the mobile device 102 could also drag-and-drop a group onto the conference device 120B. For example, the user could drag-and-drop the marketing group onto the conference device 120B. This would then cause the members of the marketing group to be called and added to the conference call when answered.

In each of the above embodiments, the mobile device 102 does not have to be directly involved in the established communication session. Instead, the mobile device 102 provides a personalized user interface 300 that allows the user of the mobile device 102 to user personalized calendar information 302, contacts 142, and call history 132 for establishing a communication session via the conference device 120.

In another embodiment, a virtual keyboard or keypad (not shown) may be displayed in the user interface 300 that allows the user to manually initiate a call from the conference device 120A (e.g., by entering a telephone number and then dragging-and-dropping the entered telephone number onto one of the detected conferencing devices 310.

Although not shown, the user of the mobile device 102 may control various aspects of the conference device 120 via the user interface 300. For example, the user may select the conference device 120A to change the volume of the conference device 120A, mute the conference device 120A, mute a specific user in the conference call, display a list of users in the conference call, and/or the like. The user may also be able to initiate communications in other mediums. For example, the user may be able have the conference device 120 send an email to an individual participant or all the conference participants in the communication session via the user interface 300.

In FIG. 3, the different functions are described using different drag-and-drop methods. However, one of ordinary skill in the art would recognize that instead of using drag-and-drop methods, other ways would be obvious to implement the above descriptions of FIG. 3. For example, menus and/or buttons may be used instead of drag-and-drop functionality. Moreover, voice commands may be used to join/establish/manage a communication session.

In FIG. 3, the information that is displayed in the user interface 300 comes from different systems. For example, in FIG. 3, the user interface 300 comprises information from the calendar application, 141 (the email system 140), the personal contacts 142 (the email system 140), and the call history 132 (the communication system 130). In one embodiment, the mobile device 102 may gather this information from the different systems. Alternatively, the information that is provided in the user interface 300 may come from a common collaboration system (e.g., communication system 130) that manages all the communications of the user. In this embodiment, a common application (e.g., in the communication system 130) that manages all communications of the user (e.g., voice, video, IM, email, text, virtual reality, and/or the like) provides the information displayed in the user interface 300 by the mobile application 103.

FIG. 4 is an exemplary user interface 400 for matching a calendar event for a meeting to a conference device 120. FIG. 4 comprises a user interface 400, an indicator that the conference call has begun 401, a closest conference device 120A, a join button 403, and a skip button 404. FIG. 4 is an embodiment of a user interface 400 that can be automatically displayed, by the mobile application 103, to the user of the mobile device 102.

The mobile application 103 determines that the calendar event for the upcoming conference call 302 has just started (i.e., it is 11:00 AM) or is just about to start. The mobile application 103 also has determined that the conference device 120A is the closest conference device 120 in proximity to the mobile device 102. The mobile application 103 automatically displays the user interface 400 when the conference begins and asks the user if he/she wants to join the conference call for Project X by using the conference device 120A. For example, the mobile application 103 may display the user interface 400 over the user interface 300. The user may select the join button 403 to join the conference call for Project X. Alternatively, the user may elect to skip the conference call for Project X by selecting the skip button 404. When the user selects the skip button 404, the user interface 400 may be closed.

In one embodiment, the detected conferencing devices 310 may be displayed instead of the closest conference device 120A. In this embodiment, the user can select the specific conferencing device 120 and then select the join button 403 to join the conference call for Project X.

FIG. 5 is an exemplary user interface 500 for personalizing a printer/scanner 220. FIG. 5 shows the user interface 500, in the display 105 of the mobile device 102, which is provided by the mobile application 103 to a user of the mobile device 102.

The user interface 500 comprises the call history 132, the personal contacts 142, a file browser 501, a communication type menu 502, and a list of detected printing/scanning devices 510. The file browser 501 allows the user to display different documents that may be selected by the user of the mobile device 102. As shown in FIG. 5, the file browser 501 is showing three documents: 1) Product X Marketing Doc, 2) Product X Sales Doc, and 3) Product X Market Report Doc in the directory C:\Documents\Marketing.

The communication type menu 502 allows the user to originate/send communications/communication sessions based on a printed, scanned, and/or faxed document. For example, to select a particular type of communication, the user may touch, via a touch screen, the desired type of communication. As shown in FIG. 5, the user has selected the email communication (greyed in this example).

The list of detected printing/scanning devices 510 shows a list of printers/scanners 220 that are currently within range of the Bluetooth® interface 104A of the mobile device 102. For example, the Bluetooth® interface 104A may detect the list of printing/scanning devices 510 (e.g., printers/scanners 220A-220N) by detecting Bluetooth® beacons that are being sent from the Bluetooth® interfaces 104B in the printers/scanners 220A-220N. The list of detected printing/scanning devices 510 shows a list of printers/scanners 220A-220N that are currently within range of the Bluetooth® interface 104A of the mobile device 102. The list of detected printing/scanning devices 510 displays which of the printers/scanners 220 are the closest (e.g., by showing a range/distance from the mobile device 102). This allows a user to walk up to a printer/scanner 220 and select the printer/scanner 220 that is closest. Alternatively, a name of the printing/scanning device 220 may be displayed that allows the user to select a specific printer/scanner 220.

The user interface 500 allows for a more personalized printing process. For example, the user may be at a new location and does not know the names or locations of printers in the building. By bringing up the user interface 500, the user can walk around the building to locate the printer 220B based on the list of detected printing/scanning devices 510. Once the printer 220B is detected, the user can walk up to the printer 220B (which would now be displayed the closest printer/scanner 220). The user of the mobile device 102 can then drag-and-drop a document onto the printer 220B in the list of detected printing/scanning devices 510. When this occurs, the mobile application 103 sends the selected document to the printing/scanning application 221. The printing/scanning application 221 then causes the document to be printed. For example, as shown in FIG. 5, in step 520, the user may drag-and-drop the Product X Market Report Doc onto the printer 220B in the list of detected printing/scanning devices 510 to print the Product X Market Report Doc on the printer 220B.

Likewise, the user interface 500 allows for a more personalized scanning process. For example, the user can locate the scanner 220A in the same manner as discussed above for the printer 220B. The user can then scan a document. At this point, the scanner 220A, in the list of detected printing/scanning devices 510, indicates that a new document has been scanned by the scanner 220A (as shown in FIG. 5). For example, the printing/scanning application 221 may send a message to the mobile application 103 to indicate that the document has been scanned. The user can then select a communication type from the communication type menu 502 (email in this case). The user can then drag-and-drop a name from the call history 132 or the personal contacts 142 to initiate the selected communication type with the scanned document. The printing/scanning application 221 receives the request to send the email/attachment to the selected user (or group) and then sends the email and attachment (the scanned document) as requested. In another embodiment, the printing/scanning application 221 may send information to the email system 140, which in turn sends the email/attachment.

In yet another embodiment, the mobile application 103 sends a request to the printing/scanning application 221 to get the scanned document. The mobile application 103 then receives the scanned document from the printing/scanning application 221. The mobile application 103 then creates and populates the email window 530 with the attached document. After the user has filled out the email and selected the send button of email window 530, the mobile application 103 sends the email to the email system 140 for delivery to the selected user.

For example, as shown in FIG. 5, after the scanner 220A shows that the document has been scanned in the list of detected printing/scanning devices 510, the user selects the email communication type from the communication type menu 502. The user then drags-and-drops, in step 521, the user name Fritz Olsen from the call history 132 onto the scanner 220A in the list of detected printing/scanning devices 510. This causes the mobile application 103 to get the scanned document from the printing/scanning application 221. The email window 530 is then displayed to the user (e.g., over the user interface 500). The mobile application 103 automatically populates the To: and From: fields in the email based on the selected user (Fritz Olsen) and the user of the mobile device 102 (Joe Hays). The email window 530 allows the user (Joe Hays) to provide a subject and text for the email. The mobile application 103 has also automatically provided the scanned document as an attachment in the email. Once the user has filled out the email, the user can then select the send button in the email window 530 to have the mobile application 103 send the email to the email system 140 for delivery to Fritz Olsen.

Instead of just sending an email to an individual user, the process of FIG. 5 may also be used to send an email or text to a group. Instead of selecting a specific user from the call history 132 or the personal contacts 142, the user may select a group. For example, the user may select the marketing group in the personal contacts 142 to send an email with the attached scanned document to each member of the marketing group in a similar manner described above.

The above process for scanned documents is not limited to emails. For example, the user may send the scanned document via IM or text. In addition, the user may also want to initiate a voice or video call to the user to tell the selected person that an email was just sent with the scanned document. For example, the user may drag-and-drop the user name Fritz Olsen onto the voice type in the communication type menu 502.

In addition, the process described above for scanned documents may also be implemented in a similar manner for a faxed document. For example, the list of detected printing/scanned devices 510 may show two elements for scanner 220A: a scanner device 220 and a fax device 220. The user would then fax the document, select email from the communication type menu 502 and the drag-and-drop a user name from the call history 132 or personal contacts 142 onto the fax device 220. The user would then fill out the email window 530 and send the email to the selected user (or group) to tell the selected user of the faxed document.

In FIG. 5, the different functions are described using different drag-and-drop methods. However, one of ordinary skill in the art would recognize that instead of using drag-and-drop methods, other ways would be obvious to implement the above descriptions of FIG. 5. For example, menus and/or buttons may be used instead of drag-and-drop functionality. Moreover, voice commands may be used to provide a personalized management of a printing/scanning device 220.

The user interface 500 for printers/scanners 220 may also be integrated with the user interface 300 for conference device(s) 120. For example, a user may have established a conference call based on being in proximity to the conference device 120 as described in FIGS. 3-4. Based on the discussion in the conference call, the user may leave the conference call and then scan and send a scanned document, via email (or other media type), to the current participants in the conference call. In this embodiment, the call history 132 of FIG. 5 can display a group for the current participants in the conference call (e.g., Project X Conference Group) and/or a group for the participants who were scheduled to participate in the conference call (e.g., Project X Scheduled Participants Group). The user of the mobile device 102 may then select one of the conference call groups to send the scanned document in an email or text message to the selected group. After the conference has ended, in one embodiment, the group of current participants may be removed from the call history.

FIG. 6 is a flow diagram of a process for personalizing a conferencing device 120. Illustratively, the communication endpoints 101A-101N, the mobile device 102, the mobile application 103, the Bluetooth® interfaces 104A-104B, the display 105, the conference device(s) 120, the conferencing application 121, the communication system 130, the conference bridge 131, the email system 140, the calendar application 141, the printer/scanner 220, and the printing/scanning application 221 are stored-program-controlled entities, such as a computer or microprocessor, which performs the method of FIGS. 3-8 and the processes described herein by executing program instructions stored in a computer readable storage medium, such as a memory (i.e., a computer memory, a hard disk, and/or the like). Although the methods described in FIGS. 3-8 are shown in a specific order, one of skill in the art would recognize that the steps in FIGS. 3-8 may be implemented in different orders and/or be implemented in a multi-threaded environment. Moreover, various steps may be omitted or added based on implementation.

The process of FIG. 6 is from the perspective of the conference device 120. The process starts in step 600. The conference device 120 determines, in step 602, if it is in proximity to the mobile device 102. For example, if the mobile device 102 sends a message in response to receiving a Bluetooth® beacon. Alternatively, the mobile device 102 may determine if it is in proximity to the conference device 120. If the conference device 120 is not in proximity to the mobile device 102 or the mobile device 102 is not in proximity to the conference device 120, in step 602, the process of step 602 repeats. Otherwise, if the conference device 120 is in proximity to the mobile device 102 or the mobile device 102 is in proximity to the conference device 120, the process goes to step 604 to determine if the conference device 120 has been paired to the mobile device 102. For example, the mobile device 102 may be paired with the conference device 120 in various ways, such as, based on user input (e.g., as described by dragging-and-dropping elements as discussed in step 320, 321, 322, and 323), based on an automatic paring, based on user preferences, based on the user of the mobile device 102 entering an access code for the conferencing device 120, and/or the like. For example, the user may select from the mobile device 102, the conference device 120A (from the detected conference devices 310) and enter an access code for the conference device 120A to pair the mobile device 102 to the conference device 120A.

If the conference device 120 has not been paired, in step 604, with the mobile device 102, the process goes back to step 602. The conference device 120 is typically paired using an access code entered by the user (not shown) on the mobile device 102. Once paired, the conference device 120 and the mobile device 102 may automatically reconnect (re-pair) without an access code. However, in other embodiments, the paring may occur based on other information, such as a user profile.

Otherwise, if the mobile device 102 has been paired with the conference device 120 in step 604, the conference device 120 waits, in step 606, for information to be received from the mobile device 102 about a communication session/conference device 120. For example, the information may be to establish, join, and/or modify attributes of a communication session. The information may be to change an attribute of the conference device 120 (e.g., to increase a volume setting on the conference device 120). If information is not received in step 606, the process goes back to step 602.

Otherwise, if information is received in step 606, the conference device 120 tries to establish, join, and/or modify, in step 608, a communication session/conference device attribute according to the information that is sent from the mobile device 102. For example, the communication session may be established, joined, and/or modified in any of the processes described above in FIGS. 3-4. If the action of step 608 is not successful in step 610, the process notifies the user of the mobile device 102 that the action was not successful in step 612 and the process goes back to step 602. For example, the user of the mobile device 102 may be notified in step 612 if the call could not be established for some reason. If the action is successful, in step 610, the conference device 120 communicates with the communication endpoints 101A-101N in the communication session and/or implements the action (e.g., to mute the conference device 120). The process then goes back to step 602.

Figure 7:
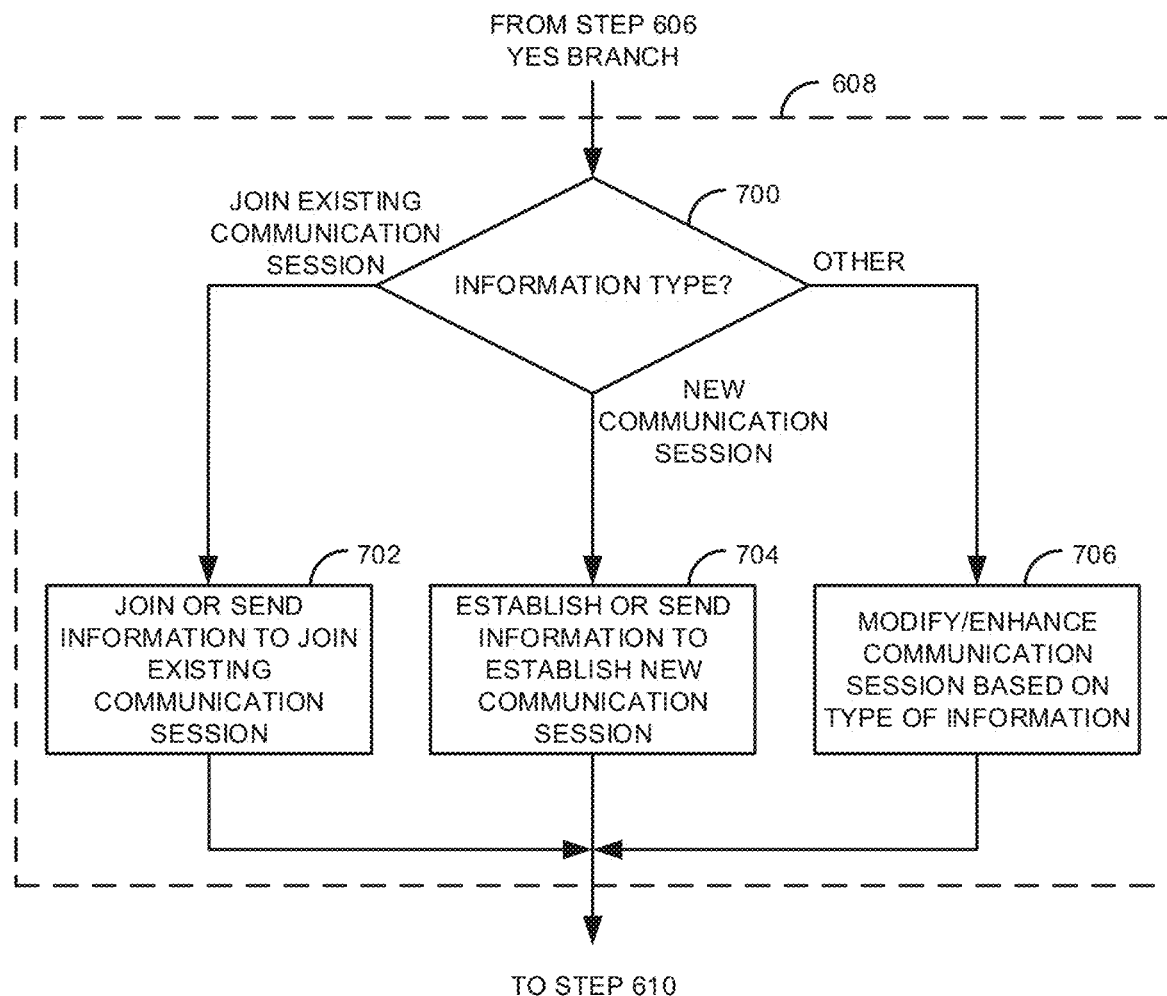
FIG. 7 is a flow diagram of a process for determining how to manage communication sessions in a shared conferencing device.

FIG. 7 is a flow diagram of a process for determining how to manage communication sessions in a conferencing device 120. FIG. 7 is an exemplary embodiment of step 608 of FIG. 6. After receiving information from the mobile device 102, the conferencing application 121 determines the type of information in step 700. If the type of information is to join an existing communication session (e.g., as described in FIG. 3, step 320), the conferencing application 121 calls the device associated with the existing communication session (e.g., the conference bridge 131). Alternatively, the conferencing application 121 may send the information (e.g., to the conference bridge 131), which in turn establishes the communication session on behalf of the conferencing application 121. The process then goes to step 610.

If the action is for a new communication session, the conference application 121 establishes the new communication session or sends the information to establish the new communication session. For example, as described in FIG. 3, step 321, the conferencing application 121 may dial the telephone number of Jane Doe. Alternatively, as described in step 322, the conferencing application 121 may send the information to the conference bridge 131, which in turn establishes the conference call for the marketing group. The process then goes to step 610.

Otherwise, if the information is for another type of action, the conferencing application 121 modifies/enhances the communication session/conferencing device 120. For example, the information may be to mute a particular user in the communication session. The process then goes to step 610.

Figure 8:
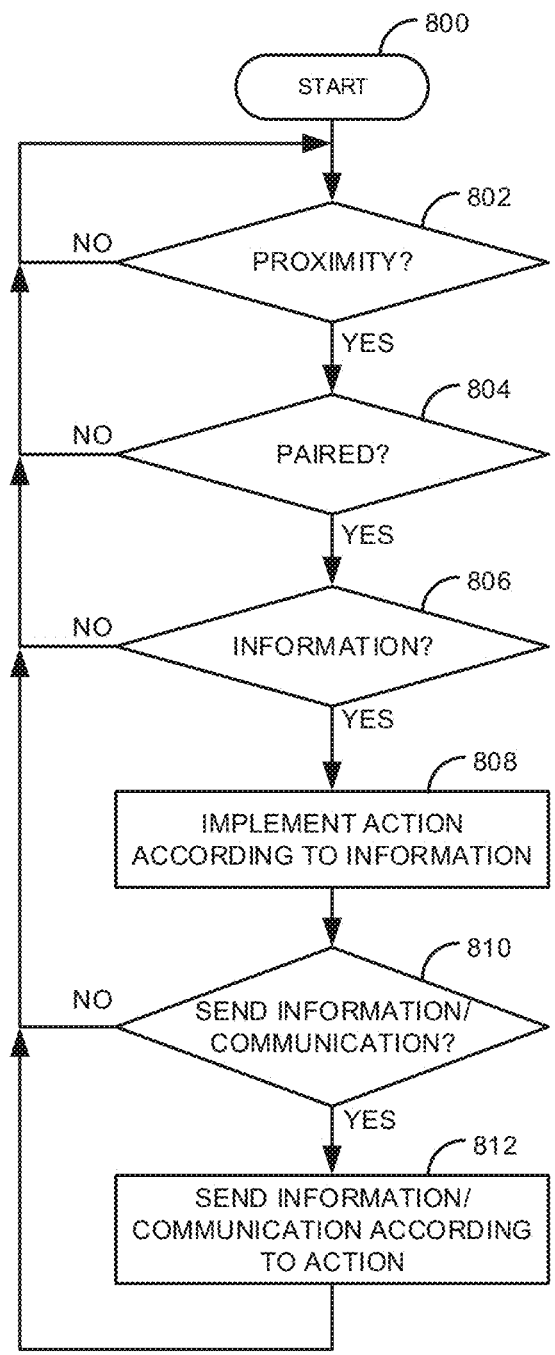
FIG. 8 is a flow diagram of a process for personalizing a printer/scanner.

FIG. 8 is a flow diagram of a process for personalizing a printer/scanner 220. The process of FIG. 8 is from the perspective of the printer/scanner 220. The process starts in step 800. The printer/scanner 220 determines, in step 802, if it is in proximity to the mobile device 102. For example, if the mobile device 102 sends a message in response to receiving a Bluetooth® beacon. If the printer/scanner 220 is not in proximity to the mobile device 102, in step 802, the process of step 802 repeats. Otherwise, if the printer/scanner 220 is in proximity to the mobile device 102, the process goes to step 804 to determine if the printer/scanner 220 has been paired to the mobile device 102. For example, the mobile device 102 may be paired with the printer/scanner 220 in various ways, such as, based on user input (e.g., as described by dragging-and-dropping elements in step 520 and 521 of FIG. 5), based on an automatic paring, based on user preferences, based on the user of the mobile device 102 entering an access code for the printer/scanner 220, and/or the like. If the printer/scanner 220 has not been paired, in step 804, with the mobile device 102, the process goes back to step 802.

Otherwise, if the mobile device 102 has been paired with the printer/scanner 220 in step 804, the printer/scanner 220 waits, in step 806, for information to be received from the mobile device 102 about a communication session/printer/scanner 220. For example, the information may be to print a document, send an email, send a text, and/or the like. If information is not received in step 806, the process goes back to step 802.

If information is received in step 806, the printing/scanning application 221 implements the action according to the information in step 808. For example, if the action is to print a document selected by the user, the printing/scanning application 221 prints the selected document. If the action is that the mobile application 103 wants to send an email that needs the scanned document, the action may be to get the scanned document. The action may be to change settings of the printer/scanner 220, such as, changing a resolution, changing color preferences, changing paper type, and/or the like.

The printing/scanning application 221 determines, in step 810, if it needs to send information to the mobile application 103 and/or send a communication (e.g., an email). For example, the action may be to send the scanned document to the mobile application 103 so that the mobile application 103 can be sent in an email to the email system 140. Alternatively, the action may indicate that the printing/scanning application 221 is to send an email to specific users and attach the scanned document. If there is no information/communication to send in step 810, the process goes to step 802. Otherwise, the printing/scanning application 221 sends the information/communication in step 812 and the process goes to step 802.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network 110, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system comprising:
a microprocessor in a first conferencing device; and
a computer readable medium, coupled with the microprocessor and comprising microprocessor readable and executable instructions that program the microprocessor to:
receive an indication that a mobile device, in proximity to the first conferencing device, has been paired with the first conferencing device;
receive information, directly from the mobile device, that indicates that the first conferencing device is to establish a communication session for one or more communication endpoints other than the mobile device, wherein the information received directly from the mobile device that indicates that the first conferencing device is to establish the communication session for the one or more communication endpoints is based on information that is personal to a user of the mobile device,
wherein the information received directly from the mobile device that indicates that the first conferencing device is to establish the communication session for the one or more communication endpoints is from a personal calendar event, and wherein an access code for a conference bridge and a communication address of the conference bridge are taken from the personal calendar event received directly from the mobile device after the mobile device has paired with the first conferencing device and are used by the first conferencing device to establish the communication session for the one or more communication endpoints;
permit, upon pairing of the first conferencing device with the mobile device, the mobile device to automatically re-pair with the first conferencing device and reconnect with the communication session without further requiring the access code from the mobile device, wherein the mobile device further provides the first conferencing device with information describing users who are currently in the communication session when the mobile device is paired with the first conferencing device; and
communicate with the one or more communication endpoints in the communication session.

2. The system of claim 1, wherein the communication session is with a plurality of communication endpoints other than the mobile device and wherein the information that indicates that the first conferencing device is to establish the communication session for the one or more communication endpoints further comprises a plurality of communication addresses of the plurality of communication endpoints.

3. The system of claim 2, wherein one of the plurality of communication addresses of the plurality of communication endpoints was changed from a proposed communication address to the one the plurality of communication addresses for the plurality of communication endpoints based on an acceptance of the personal calendar event of a meeting by a user of a communication endpoint of the one of the plurality of communication addresses.

4. The system of claim 1, wherein the indication that the mobile device has been paired with the first conferencing device is based on a user selection of a closest conferencing device that is displayed to the user of the mobile device in a list of at least two or more detected conferencing devices.

5. The system of claim 1, wherein a mobile application on the mobile device determines that the personal calendar event is about to occur or has just started and displays, to the user of the mobile device, the personal calendar event and a list of one or more detected conferencing devices that the user of the mobile device can use to establish the communication session, wherein the list of one or more detected conferencing devices includes a representation of the first conferencing device, and wherein the user of the mobile device drags-and-drops the personal calendar event that is about to occur or has just started onto the representation of the first conferencing device to establish the communication session for the personal calendar event that is about to occur or has just started.

6. The system of claim 1, wherein the information received directly from the mobile device that indicates that the first conferencing device is to establish the communication session for the one or more communication endpoints is based on a user selection from a personal contact list or a personal call history of the user of the mobile device.

7. The system of claim 1, wherein the received information indicates that the first conferencing device is to establish the communication session, wherein the mobile device is not directly involved in the established communication session.

8. The system of claim 6, wherein establishing the communication session for the one or more communication endpoints is based on the personal call history of the user of the mobile device.

9. A method comprising:
receiving, by a microprocessor of a first conferencing device, an indication that a mobile device, in proximity to the first conferencing device, is paired with the first conferencing device;
receiving information, by the microprocessor, directly from the mobile device, that indicates that the first conferencing device is to establish a communication session for one or more communication endpoints, wherein the information received directly from the mobile device that indicates that the first conferencing device is to establish the communication session for the one or more communication endpoints is based on information that is personal to a user of the mobile device, wherein the information received directly from the mobile device that indicates that the first conferencing device is to establish the communication session for the one or more communication endpoints is from a personal calendar event, and wherein an access code for a conference bridge and a communication address of the conference bridge are taken from the personal calendar event received directly from the mobile device after the mobile device has paired with the first conferencing device and are used by the first conferencing device to establish the communication session for the one or more communication endpoints;
permitting, upon pairing of the first conferencing device with the mobile device, the mobile device to automatically re-pair with the first conferencing device and reconnect with the communication session without further requiring the access code from the mobile device, wherein the mobile device further provides the first conferencing device with information describing users who are currently in the communication session when the mobile device is paired with the first conferencing device; and
communicating, by the microprocessor, with the one or more communication endpoints in the communication session.

10. The method of claim 9, wherein the communication session is with a plurality of communication endpoints other than the mobile device and wherein the information that indicates that the first conferencing device is to establish the communication session for the one or more communication endpoints further comprises a plurality of communication addresses of the plurality of communication endpoints.

11. The method of claim 10, wherein one of the plurality of communication addresses of the plurality of communication endpoints was changed from a proposed communication address to the one the plurality of communication addresses for the plurality of communication endpoints based on an acceptance of the personal calendar event of a meeting by a user of a communication endpoint of the one of the plurality of communication addresses.

12. The method of claim 9, wherein the indication that the mobile device has been paired with the first conferencing device is based on a user selection of a closest conferencing device that is displayed to the user of the mobile device in a list of at least two or more detected conferencing devices.

13. The method of claim 9, wherein a mobile application on the mobile device determines that the personal calendar event is about to occur or has just started and displays, to the user of the mobile device, the personal calendar event and a list of one or more detected conferencing devices that the user of the mobile device can use to establish the communication session, wherein the list of one or more detected conferencing devices includes a representation of the first conferencing device, and wherein the user of the mobile device is enabled to drag-and-drop the personal calendar event that is about to occur or has just started onto the representation of the first conferencing device to establish the communication session for the personal calendar event that is about to occur or has just started.

14. The method of claim 9, wherein the information received directly from the mobile device that indicates that the first conferencing device is to establish the communication session with for one or more communication endpoints is based on a user selection from a personal contact list or a personal call history of the user of the mobile device.

15. The method of claim 9, wherein the received information indicates that the first conferencing device is to establish the communication session, wherein the mobile device is not directly involved in the established communication session.

16. A system comprising:
a microprocessor in a scanning device; and
a computer readable medium, coupled with the microprocessor and comprising microprocessor readable and executable instructions that program the microprocessor to:
receive an indication that a mobile device, in proximity to the scanning device, has been paired with the scanning device;
receive information, directly from the mobile device, describing a group of participants who are currently in a conference call when the mobile device is paired with the scanning device; and
receive information, directly from the mobile device, that indicates that the scanning device is to automatically, and in response to receiving the indication that the mobile device has been paired with the scanning device, send a scanned document in an email based on the group of participants who are currently in the conference call when the mobile device is paired with the scanning device, wherein the conference call was initiated by a conferencing device based on the conferencing device being in proximity with and paired to the mobile device.

17. The system of claim 16, wherein the microprocessor readable and executable instructions further program the microprocessor to send the scanned document in response to detecting a dragging-and-dropping input in which a name of a user is dragged-and-dropped from a call history obtained from the mobile device.

\* \* \* \* \*